United States Patent [19]
Guttin

[11] Patent Number: 5,848,759
[45] Date of Patent: Dec. 15, 1998

[54] DEVICE THAT AUTOMATES THE OPENING AND CLOSING OF A ROCKER BEARING

[75] Inventor: Christian Guttin, Les Abrets, France

[73] Assignee: Guttin Christian Sárl, France

[21] Appl. No.: 788,015

[22] Filed: Jan. 24, 1997

[30] Foreign Application Priority Data

Jan. 25, 1996 [FR] France .................................. 96 01032

[51] Int. Cl.[6] ................................................ B65H 18/04
[52] U.S. Cl. ........................ 242/598.4; 279/106; 403/316
[58] Field of Search ........................ 242/598.4; 403/316; 279/106, 35

[56] References Cited

U.S. PATENT DOCUMENTS

| | | | |
|---|---|---|---|
| 3,147,982 | 9/1964 | Hornberger et al. | 242/598.4 |
| 3,246,858 | 4/1966 | Alexeff | 242/595.4 |
| 4,681,478 | 7/1987 | Kunz | 242/598.4 |

FOREIGN PATENT DOCUMENTS 2926577  1/1981  Germany.
3127553  1/1983  Germany.

OTHER PUBLICATIONS

French Search Report dated Oct. 28, 1996 for French application no. Fr 9601032.

Primary Examiner—John M. Jillions
Attorney, Agent, or Firm—Young & Basile, P.C.

[57] ABSTRACT

A device that automates the opening and closing of a rocker bearing of the type containing at its end a shaft mobile in a rotating manner and a flywheel capable of moving to cover a seat in which is placed the end of a winding rod. The device contains a jack fixed on the top of a body of the bearing in a manner able to pivot around an axis perpendicular to the axis of rotation of the bearing. The rod contains at its end a ball and socket joint on which is mounted a roller which lodges itself in a peripheral groove in the rockable flywheel of the bearing.

5 Claims, 2 Drawing Sheets

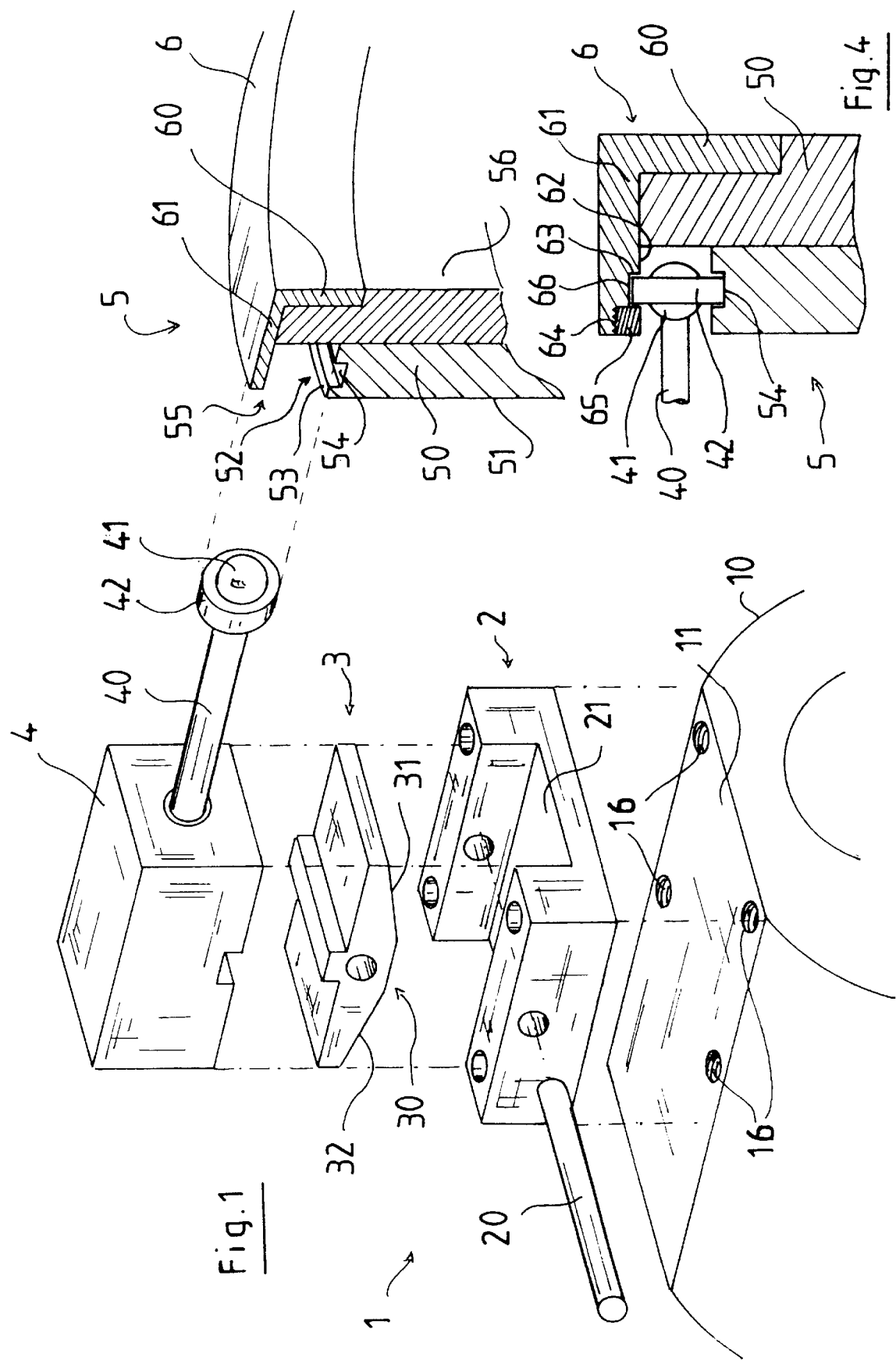

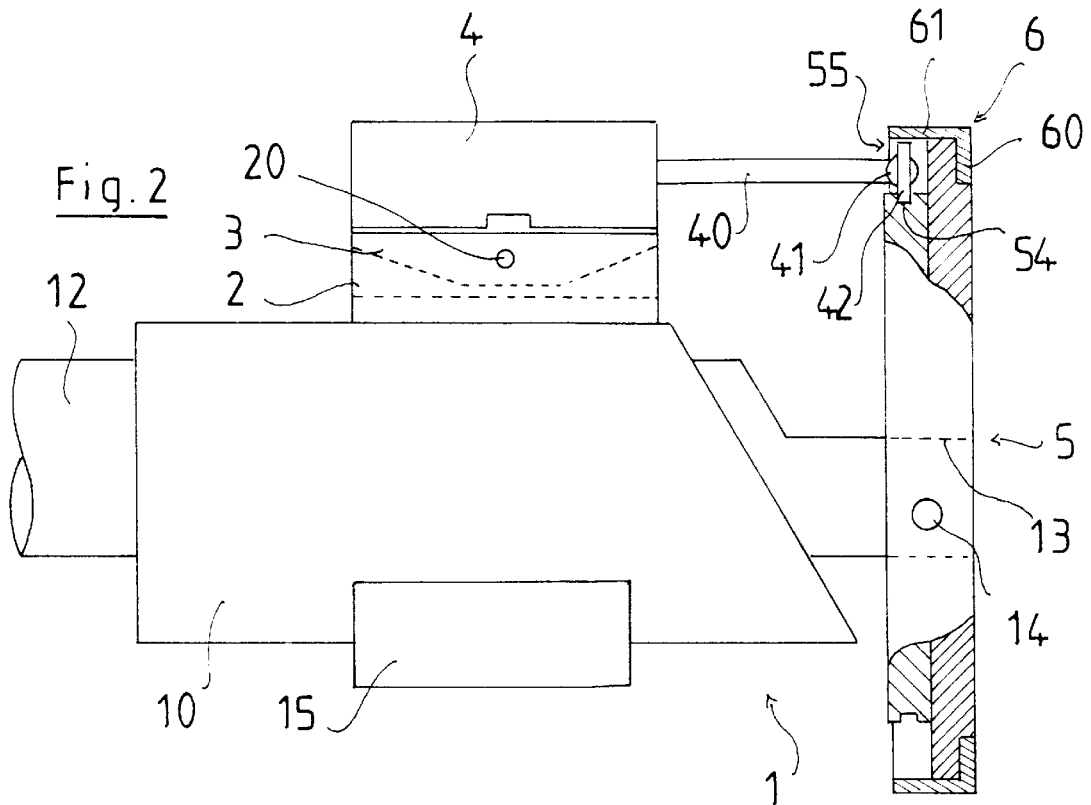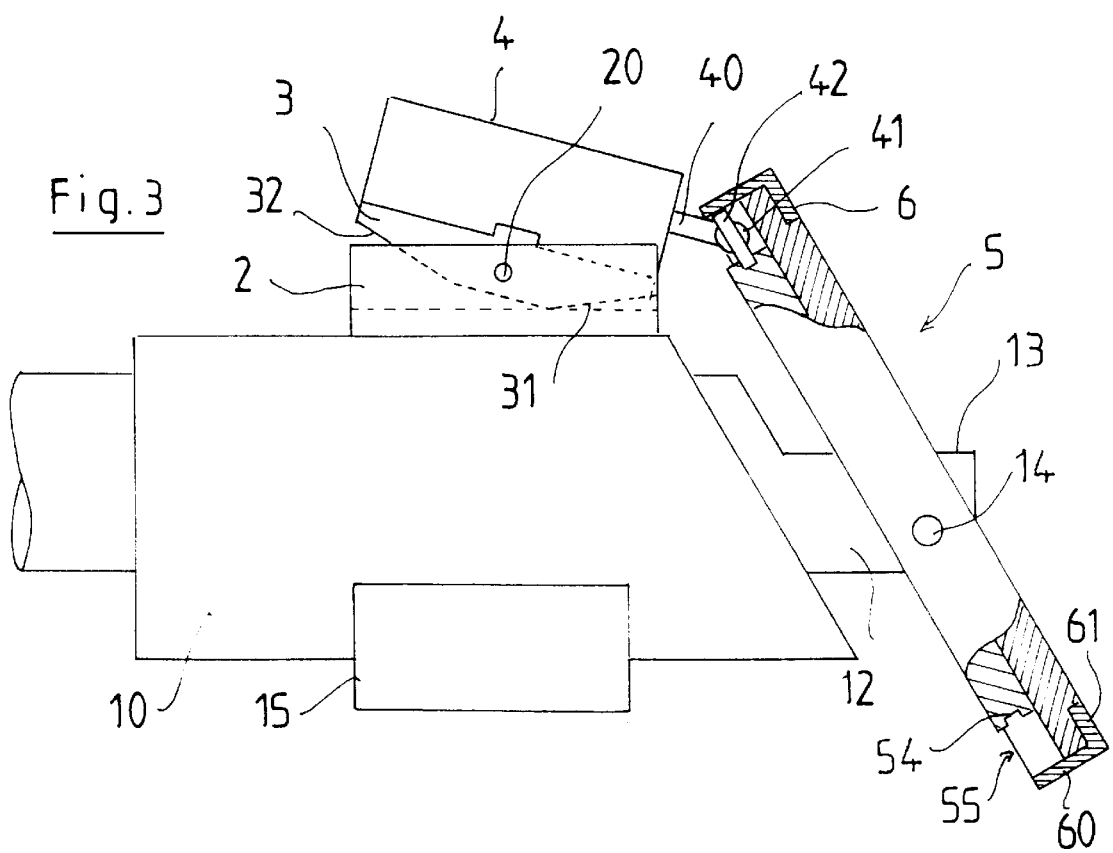

DEVICE THAT AUTOMATES THE OPENING AND CLOSING OF A ROCKER BEARING

BACKGROUND OF THE INVENTION

The present invention is a device that automates the opening and closing of a rocker bearing.

A rocker bearing is a bearing designed to carry one of the ends of a winding rod, for the winding and unwinding of sheets of material and including a seat blockable by the rocking of a flywheel.

Rocker bearings known at present include a shaft movable in rotation in a fixed body, one end of which is fixed to a motor system and the other end of which comprises on its end a seat, generally furnished with a wear piece, and a flywheel rockable around an axis perpendicular to the shaft, and capable of covering the generally square cross section end of the winding rod deposited in the seat, for the locking of the rod.

In use, the end of the winding rod is placed in the seat, and the flywheel is rocked manually or automatically by the rotation movement, the rocking in the reverse direction allowing the removing of the winding rod.

If the closing of a bearing can be achieved automatically, the opening is necessarily achieved manually, which can be a waste of time.

One already knows of rocker bearing devices that open pneumatically, for example, that which is described in document DE-A-31 27 553, which includes a piece in the form of a stirrup positioned astride the rim of the flywheel, and mobile in movement about an axis parallel to the axis of rotation of the bearing, the piece being also linked to the body of the bearing by means of a jack assuring the movement.

This device presents, however, some inconveniences. It requires a particular form of the rim in order that the stirrup can fit therein whatever the position of the flywheel so that this device cannot be mounted on all existing bearings which must therefore be replaced.

On the other hand, wear occurs on the rim of the flywheel and on the internal part of the stirrup due to the friction caused by the rotation of the flywheel at great speed.

The present invention has as an aim to remedy these diverse inconveniences by proposing a device that automates the opening and closing of a rocker bearing, and that is able to be adapted to existing bearings, therefore not requiring their replacement.

SUMMARY OF THE INVENTION

The device of the present invention is essentially characterized by a jack rotatably fastened on the top of the bearing body around an axis perpendicular to the axis of rotation, the rod of which bears at its end a ball and socket joint on which is mounted a roller lodged in a peripheral groove provided in the rear face of the rockable flywheel of the bearing.

In practice, the adaption of the device according to the invention on an existing bearing requires the preparation of the body of the bearing to permit the fastening of the plate and the replacement of the existing flywheel by another flywheel containing a peripheral groove.

BRIEF DESCRIPTION OF THE DRAWINGS

The advantages and the characteristics of the present invention will become more clear in the description that follows and which relates to the attached drawing, which presents a non-limiting embodiment thereof in which:

FIG. 1 represents a perspective, exploded view with a partial cut of the device of the invention;

FIG. 2 represents a schematic view with partial cutouts of a closed rocker bearing equipped with the same device;

FIG. 3 represents the same view when the rocker bearing is open; and

FIG. 4 represents a partial cutout view of a variance of the device of the invention.

DESCRIPTION OF THE PREFERRED EMBODIMENTS

If one refers to FIGS. 1 and 2 one can see the body 10 of a rocker bearing 1 on the top of which is a flattening 11 pierced in order to permit the fastening by a screw of a cap 2 with a U-shaped cross-section, crossed by a shaft 20 perpendicular to the pivot shaft 12 of the bearing, visible in FIG. 2, and in which is introduced a plate 3 rotatably mounted around the shaft 20. A hydraulic jack 4 is fixed, by appropriate means, not represented, to the cap 2.

The bearing 1 comprises, in a known manner, a flywheel 5 able to rock on the seat 13 of the pivot shaft 12 around a spindle 14, as can be seen in FIG. 2.

The body 50 of the flywheel 5 is provided on the periphery of its rear face 51 with a rabbet 52 of which a side 53, perpendicular to the plane of flywheel 5, contains a groove 54.

An annular profile 6, of L-shaped cross section, which has a flat wing 60 and a circular wing 61, is fixed to the body 50 of the flywheel 5 to create, in association with the rabbet 52, a peripheral groove 55. The flat wing 60 is fixed by a screw to the front face 56 of the body 50, while the circular wing 61 stretches towards the rear perpendicular to the plane of the flywheel 5 and parallel to the side 53.

The rod 40 of the jack 4 includes at its end a ball and socket joint 41 to which is fixed, with possibilities of rotation and angular movement, a roller 42 designed to be introduced in the groove 55, where it rolls and is maintained by the groove 54 and the wing 61 of the profile 6.

If one now refers to FIG. 3 one can see that the opening of the bearing 1 by rocking the flywheel 5 on the seat 13 of the pivot shaft 12 around the spindle 14 is obtained by the run-in of the rod 40 of the jack 4, which is achievable by the pivoting of the plate 3 around the pivot shaft 20 and by the angular mobility of the roller 42 on the ball and socket joint 41.

The lower face 30 of the plate 3, which is at a certain distance from the bottom 21 of the cap 2, comprises front 31 and rear 32 beveled parts in order to facilitate pivoting in the cap 2 around the pivot shaft 20 while reducing the overall dimensions of the bearing.

Pivoting of the plate 3 towards the front permits the opening of the bearing 11, as is visible in FIG. 3, while pivoting towards the rear remedies a level difference between the jack 4 and the groove 55.

It must be noted that the means of driving the shaft 12 of the bearing 1 is preferably controlled by means of indexing means, such as a photocell for example, which permits stopping the rotation of the shaft 12 in a position allowing the rocking of the flywheel 5.

The equipment of an existing bearing with the device of the invention necessitates the realization of the flattening 11 and of screwed openings 16, visible in FIG. 1, for the fastening of the cap 2, and the replacement of the existing flywheel by a flywheel 5 provided with a groove 55.

It must be noted that the bearing represented is a bearing fixed by means of a box 15, and, in the case of a flange bearing, the jack is positioned in front of the flange under the bearing, the pivoting of the jack being achieved at the rear of the bearing.

If one now refers to FIG. 4 one can see that, alternately, the internal side 62 of the circular wing 61 of the profile 6 includes on all of its perimeter a shouldering wall 63 and in its end part a thread 64 designed for the fixation of a ring 65 threaded on the outside creating between the shouldering wall 63 and the ring 65, in front of the groove 54, a groove 66 which also permits the retaining of the roller 42.

What is claimed is:

1. A device for automating the opening and closing of a rocker bearing of the type comprising a rotatable shaft rotatably mounted in a bearing body, and a rockable flywheel coupled at the end of the shaft for movably covering a seat in the rotatable shaft which is adapted for receiving a winding rod, characterized by a jack fixed on top of the bearing body and rotatable around a pivot shaft perpendicular to the rotatable shaft in the bearing body, a rod carried by the jack including a ball and socket joint at one end on which is mounted a roller held in a groove provided in a rear face of the rockable flywheel.

2. The device according to claim 1 characterized by the jack being coupled to the bearing body by means of a plate fixed to the jack, the plate rotatably mounted around the pivot shaft carried in a cap fastened to the bearing body.

3. The device according to claim 1 characterized by the peripheral groove formed by a rabbet provided on the edge of the rear face of the flywheel body, associated with an annular profile of an L-shaped cross-section containing a flat wing and a circular wing, the flat wing being fixed to the front face of the flywheel while the circular wing extends towards the rear perpendicular to the plane of the flywheel, opposite to the rabbet, a side of the rabbet parallel to the circular wing having a groove in which the roller may roll.

4. The device according to claim 3 characterized in that the internal side of the circular wing of the annular profile contains a shouldering wall along all of its perimeter and a thread at its end part receiving a ring threaded on the outside, which creates another groove between the shouldering wall and the ring opposite to the peripheral groove, both grooves cooperating for retaining the roller.

5. The device according to claim 1 characterized by the shaft of the bearing adapted to be rotated by a driving system adapted to be controlled by indexing means which permits the stopping of the rotation of the rotatable shaft in a position enabling the rocking of the flywheel.

* * * * *